United States Patent
Weyman et al.

(10) Patent No.: US 7,123,615 B2
(45) Date of Patent: Oct. 17, 2006

(54) STACKED NETWORK ROUTERS

(75) Inventors: Raphael J Weyman, Hemel Hempstead (GB); Maurice A Goodfellow, Dunstable (GB)

(73) Assignee: 3Com Corporation, Marlborough, MA (US)

( * ) Notice: Subject to any disclaimer, the term of this patent is extended or adjusted under 35 U.S.C. 154(b) by 1036 days.

(21) Appl. No.: 10/093,506

(22) Filed: Mar. 11, 2002

(65) Prior Publication Data
US 2003/0147412 A1 Aug. 7, 2003

(30) Foreign Application Priority Data
Feb. 2, 2002 (GB) ................................ 0202425.5

(51) Int. Cl.
H04L 12/56 (2006.01)
(52) U.S. Cl. ..................................... 370/389
(58) Field of Classification Search ...................... None
See application file for complete search history.

(56) References Cited
U.S. PATENT DOCUMENTS

| 6,282,201 | B1 | | 8/2001 | Alexander, Jr. et al. | |
| 6,553,027 | B1 | * | 4/2003 | Lam et al. | 370/386 |
| 6,594,231 | B1 | * | 7/2003 | Byham et al. | 370/223 |
| 6,785,272 | B1 | * | 8/2004 | Sugihara | 370/386 |
| 6,785,286 | B1 | * | 8/2004 | O'Keeffe et al. | 370/397 |
| 6,801,527 | B1 | * | 10/2004 | O'Keeffe et al. | 370/386 |
| 6,934,292 | B1 | * | 8/2005 | Ammitzboell | 370/400 |
| 6,999,452 | B1 | * | 2/2006 | Drummond-Murray et al. | 370/389 |
| 2002/0046271 | A1 | * | 4/2002 | Huang | 370/256 |
| 2002/0057683 | A1 | * | 5/2002 | Poulter et al. | 370/386 |
| 2002/0057685 | A1 | * | 5/2002 | Ambe et al. | 370/386 |

FOREIGN PATENT DOCUMENTS

GB 2365718 A 2/2002

* cited by examiner

Primary Examiner—Chi Pham
Assistant Examiner—Anh-Vu Ly

(57) ABSTRACT

A cascaded stack of routing units each of which routes packets that it receives at its external ports and which conduct an election for a lead router that lends network and media access control addresses to the router interfaces of the other units in the stack. These other subordinate units have selected ancillary functions suppressed but otherwise have full routing capability. A packet entering the stack and requiring routing is routed by the unit that receives it and is thereafter bridged to its egress port.

9 Claims, 5 Drawing Sheets

STACKED NETWORK ROUTERS

FIELD OF THE INVENTION

This invention relates to packet-switched communication networks and more particularly to the connection of independent routing entities (called herein 'routers') so that they appear to constitute a single logical routing entity. More particularly the invention relates to such routers compatible with MAC (media access control) addresses, of which Ethernet is an example. The invention specifically concerns the organisation and operation of stackable routers in a manner which improves their performance in respect of usage of bandwidth in a cascade connection, minimises the difference in operation between the different units in the stack and in other respects which will become more apparent hereinafter.

BACKGROUND TO THE INVENTION

Network units, such as switches and routers which include a multiplicity of ports for connection to other units or users are commonly made with a fixed number of ports in order to achieve efficiency of manufacture. It is well known to 'stack' such units, by which is meant their connection by what is known as a cascade connection, which enables them not only to receive and forward packets from their own ports but also to forward packets to other units in the stack where destination ports are on a unit other than the unit which first received the packet. Packets which are passed between the units for this purpose travel on a cascade connection, which normally comprises a data path (for the packets) and a control path which enables the units to exchange control and status information for a variety of purposes. These paths may be physically separate but need not be. Physically the units may be stackable, though the physical aspect of stacking is not an essential feature of the present invention. Known stacking arrangements are disclosed and exemplified by the Super Stack 3 Switch 3300 made by 3Com Corporation of Santa Clara, Calif. and the Switch 4400 of the same Corporation.

Although the facility of stacking has a substantial number of operational benefits, there are difficulties which may offset those benefits.

For example, since all packets that are received by any unit in the stack and require forwarding from another unit must travel by way of the cascade, the requirement for bandwidth in the cascade connection can be very substantial. It is desirable in almost all circumstances to minimise the usage of bandwidth on the cascade.

Two well-known network functions are 'bridging' and 'routing'. The former term, as well as the term 'bridge', is normally used to signify the receiving and forwarding of addressed data packets in accordance with media access control addresses (layer 2 addresses).

Routing is used to signify communication between different sub-nets or networks. Although media access control addresses are employed to convey a packet on each hop of a journey, routers are employed to determine a multiple-hop route for a packet. For this purpose it has recourse to a number of well known resources, such as a router information protocol or the like by means of which it can build 'directories' or routing tables.

It is known to provide a stack of switch units which have routing enabled in one unit only, the routing functions if any in the other units being disabled. Such a scheme requires all traffic that requires routing and not received at or forwarded from the routing unit to traverse the cascade twice, and also heavily loads the single active routing entity.

SUMMARY OF THE INVENTION

The present invention is based on the organisation of a stack of units each of which performs routing as necessary for packets that it receives, so that traffic requiring routing need traverse the cascade only once, if ingress and egress ports are on different units, or not at all, if ingress and egress ports are on the same unit, so that in effect only a single router per stack is apparently presented to a user. This can be achieved in the manner more particularly described hereinafter, but the basis of the scheme is to allow the routers to intercommunicate so that within the stack one of the routers is a 'lead router' and the other routers are 'subordinate routers', of which the lead router lends its network (IP) address to the other routers in the stack for the purpose of routing and preferably also lends its MAC address to the subordinate routers. Although each of the units is capable of routing and the unit which possesses a port on which a packet requiring routing is received is the one that routes it, if the egress port is on a different unit then, after routing, the packet will be forwarded by bridging to the unit owning the egress port. In this way, although there are multiple routers in the stack, only one will be involved explicitly in the routing of any single packet, and there will be only one routing hop.

Further features of the invention will become apparent from the following detailed description with reference to the drawings.

DETAILED DESCRIPTION

Stacked Units

Figure 1:
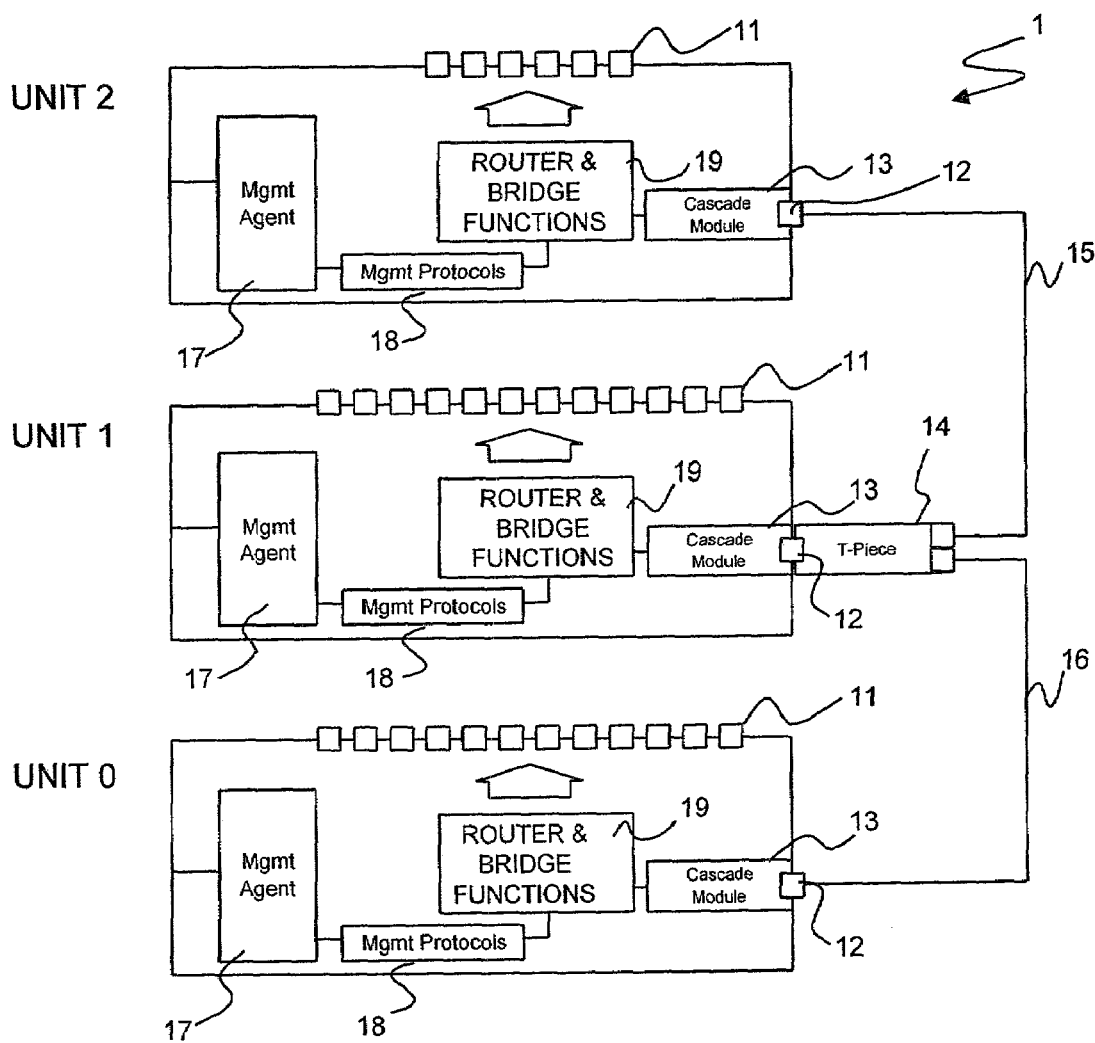
FIG. 1 illustrates one form of stack.

FIG. 1 illustrates one example of a cascaded stack of network units. FIG. 1 is a much-simplified diagram representing a stack which is organised in accordance with GB patent application GB-2365718. Other forms of cascaded stacks in which the invention may be employed are described in EP-0912944-B, GB-2361830-B, 2350530-B, 2330741-B, GB-2357390-A and GB-235969-A. A stack of units according to the invention may be organised according to various configurations known in the art.

In the stack shown in FIG. 1, there are three stacked units, denoted conventionally Unit 0, Unit 1 and Unit 2. Each of these units has a multiplicity of ordinary or 'front panel' ports, shown as 11. Each has a cascade port 12 coupled by way of a cascade module 13 to an internal port (not shown). The cascade module for the middle unit, Unit 1, co-operates with a three-port connector, or T-piece 14, which forms links with the cascade ports 12 of the top-most and lower-most units Unit 2 and Unit 0 respectively. The particular arrangement described in the earlier patent application is one in which the T-piece can maintain a connection between Unit 0 and Unit 2 notwithstanding failure or powering-down of Unit 1. The links 15 and 16 between the T-piece and the upper and lower units convey not only packets as is essential for a cascade connection but also, on respective lines, control frames which are employed to enable processing circuits in the T-piece and elsewhere to determine the operational status of the various links in the cascade and the units in the cascade.

FIG. 1 also includes for each unit a management agent 17 linked by 'management protocols' 18 with the main operating circuits of the unit. The router and bridge functions, to be described, are denoted 19.

FIG. 1 is included only to set a context for the present invention.

Figure 2:
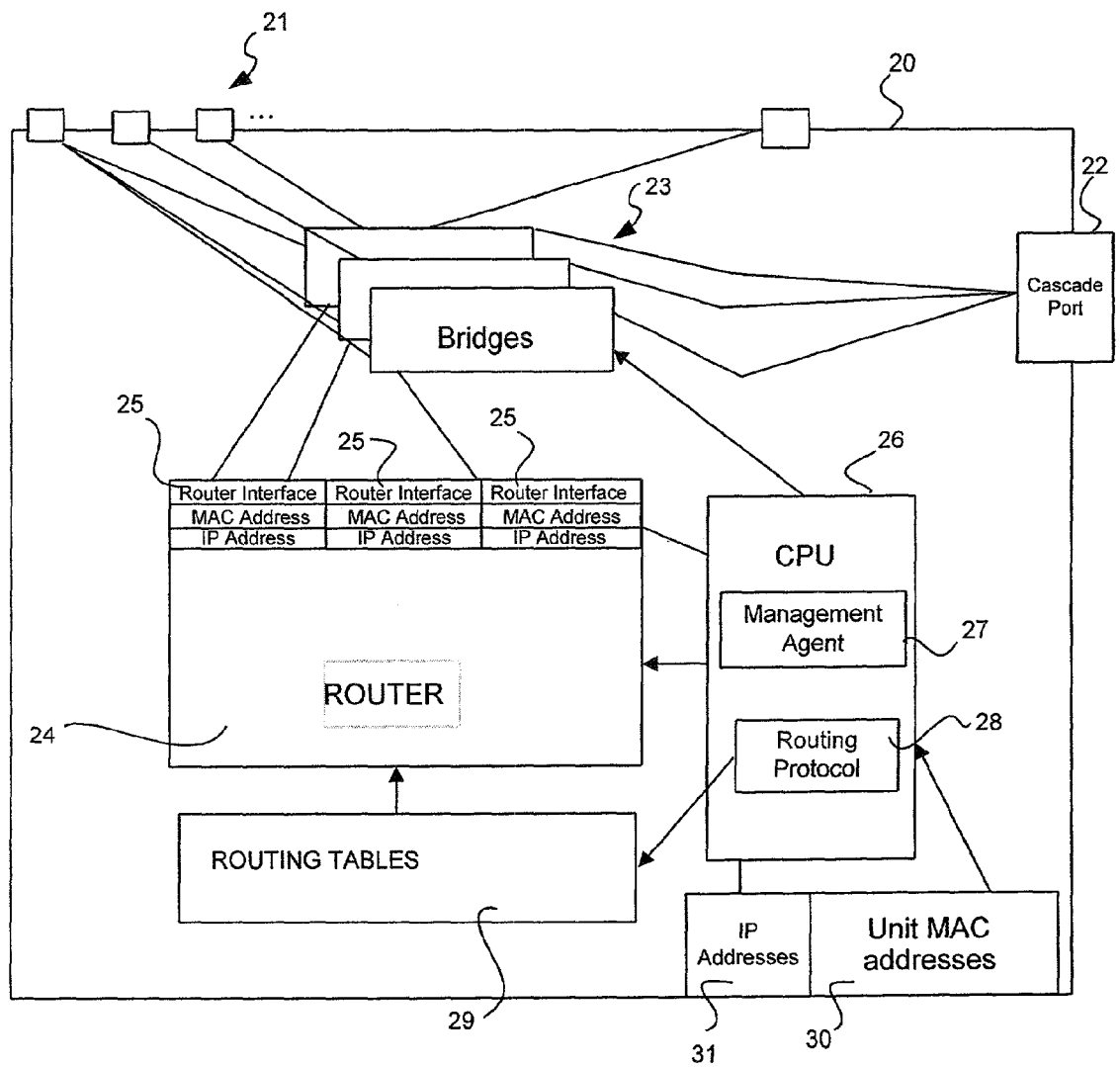
FIG. 2 illustrates a routing unit for use in a stack according to the invention.

FIG. 2 illustrates schematically one unit operable according to the invention and which is to be used in a cascaded stack according to FIG. 1 or otherwise.

The unit 20 has a multiplicity of ordinary or 'front-panel' ports 21 and at least one cascaded port 22. The unit includes at least one and usually a multiplicity of (hardware) bridges, or layer 2 switches, 23. Each port 21 is connected to at least one of the bridges 23 and the (or each) cascade port 22 is connected to all the bridges (or to a 'logical' port connected to all the bridges). The unit includes a router 24 which has at least two (and in the illustrated example three) router interfaces 25. Each router interface 25 is connected to one bridge only, although each bridge may be connected to more than one router interface 25. For each interface there is some means such as a register storing a MAC address and a network (IP) address for the interface. For controlling the bridges and the router there is a processor constituted by a CPU 26 which includes (in an appropriate memory) a management agent 27 and a routing protocol 28. The routing protocol controls routing tables 29. Also embedded in the unit, in for example an interface for the management agent, are the unit's normal addresses, i.e. its MAC address 30 and its network (IP) address 31. These addresses are used for the management of the router (for example by an external network supervisor) and would, according to prior practice, be supplied by the CPU to the router interfaces.

The routing unit shown in FIG. 2 is in hardware terms in generally known form. The essential purposes of the bridges are to provide switching of packets on, for example, the same sub-net or VLAN and to send packets to and from the router 24. Packets received at ports 21 or 22 and not requiring routing will be received by one or other of the bridges and forwarded according to the 'layer' switching executed by the relevant bridge. The router will normally need to modify the packet to provide it with a new source MAC address, decrementing a time-to-live (TTL) value in the packet's header by unity and usually re-computing a checksum. The router may also have recourse to routing tables which are established, as more particularly described later, by means of a router information protocol (RIP), so as to be able to compute a next hop for a routed packet.

It is assumed in this description that the packets which are employed are 'Ethernet' packets, typically conforming to IEEE Standard 802.3 (1998 Edition). Typically, Ethernet packets include a destination MAC address field, a MAC source address field, a VLAN identifying field, a protocol (IP) field and an IP checksum field, message data fields and a cyclic redundancy check field. Such packets are well known in the art and do not need any further description.

Basic Routing Process

All units are capable of routing packets that they receive and the unit owning the port on which a packet requiring routing is received is the one that routes it. If the egress port is on a different unit then, after routing, the packet will be forwarded by bridging to the unit owning that port. In this way, although there are multiple routers in the stack, only one will be involved in the routing of any one packet, there will be only one routing hop, and so it will appear to entities outside the stack as if the stack contains a single router.

Figure 3:
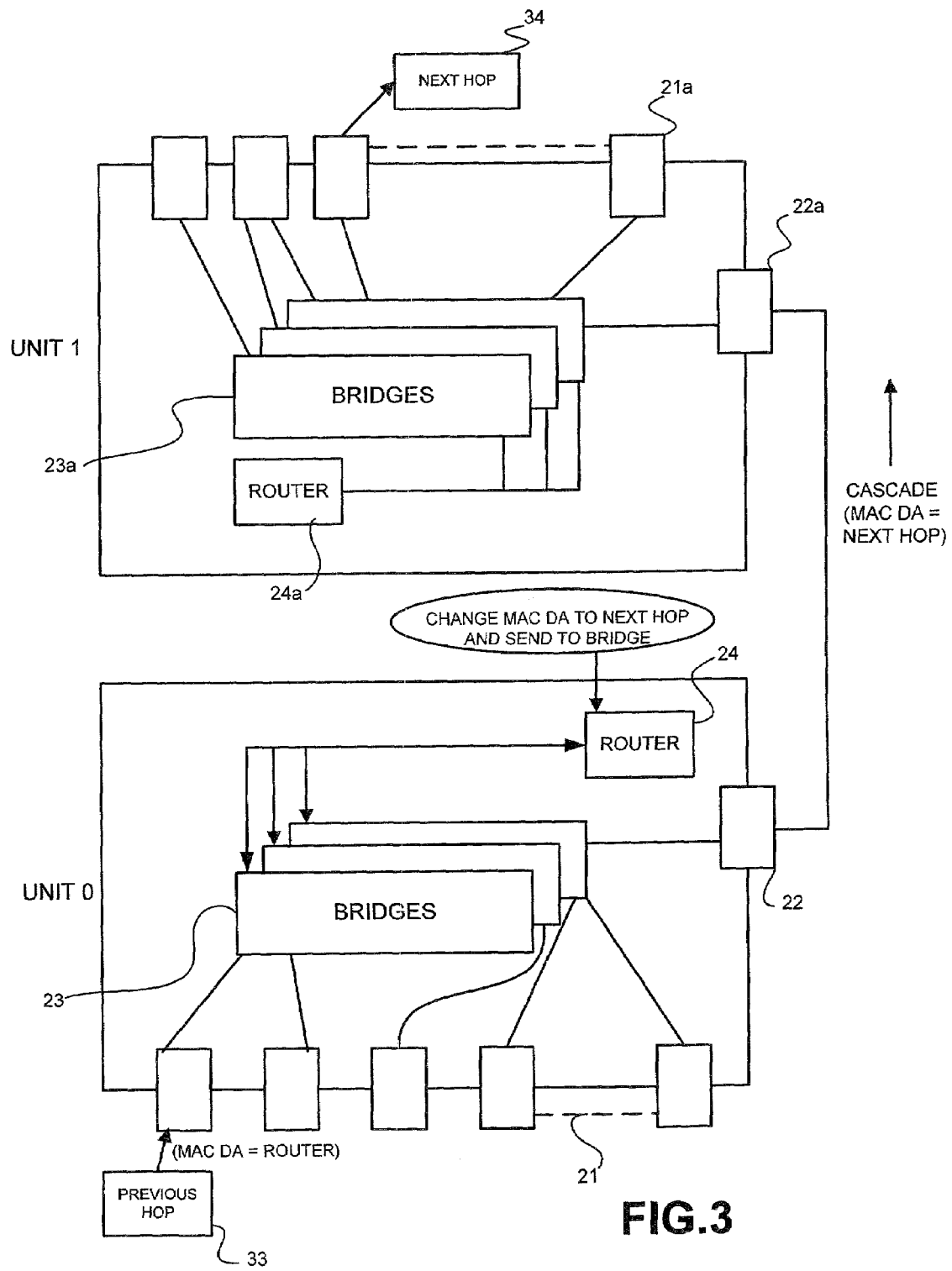
FIG. 3 illustrates the progression of a packet through a stack of routers according to the invention.

FIG. 3 illustrates the progression of a packet into and out of a stack of routers according to the invention. In the example shown in FIG. 3 it is presumed that a packet is received from a previous hop (33) at Unit 0, and will be passed via the cascade to Unit 1, and egress from a front-panel port on Unit 1 to the next hop (34).

In FIG. 3, Unit 0 has front-panel ports 21, a cascade port 22, bridges 23 and router 24. Unit 1 has front-panel ports 21a, cascade port 22a, bridges 23a and router 24a.

In the system shown in FIG. 3, a packet from the previous hop 33 is received at one of the front-panel ports 21 and at the time its MAC destination address is set to the router (24). This packet is bridged by one of the bridges 23 to the router 24, which will change the MAC destination address to that required for the next hop (and change the source MAC address to that of the router 24), make any other modifications (such as re-computing a checksum) normally required by a routing stage and send the packet to the relevant bridge so that the packet is sent out on the cascade, in this example by way of port 22.

Of course, a substantial number of packets received at the first unit may require egress only from a front-panel port 21. The reception and forwarding of such packets is not directly relevant to the present invention. However, since such of those packets that require routing will be routed by router 24, in the receiving unit, such packets will not require sending on the cascade to another unit for routing.

When the packet is received by Unit 1, by way of cascade port 22a, the destination MAC address is already set for the next hop. It can therefore be subjected to an ordinary MAC address look-up by a bridge 23a to obtain the port number for the next hop. Intervention of the router 24a in Unit 1 is not required.

Lending of Addresses

In order to facilitate the operation of the stack, the router interfaces in each unit will employ the same set of IP addresses as for the corresponding interfaces in the other units, and preferably the same MAC address, as will be explained later. This is achieved by causing one of the routers, herein called 'lead' router, to lend its router interface's IP addresses and MAC addresses to the other routers, herein called 'subordinate routers'. These terms are used to indicate not only the lending and borrowing of addresses but some minor operational differences, other than in the primary task of routing packets, which is shared by all the routers; these differences are explained later.

Election of Routers

Figure 4:
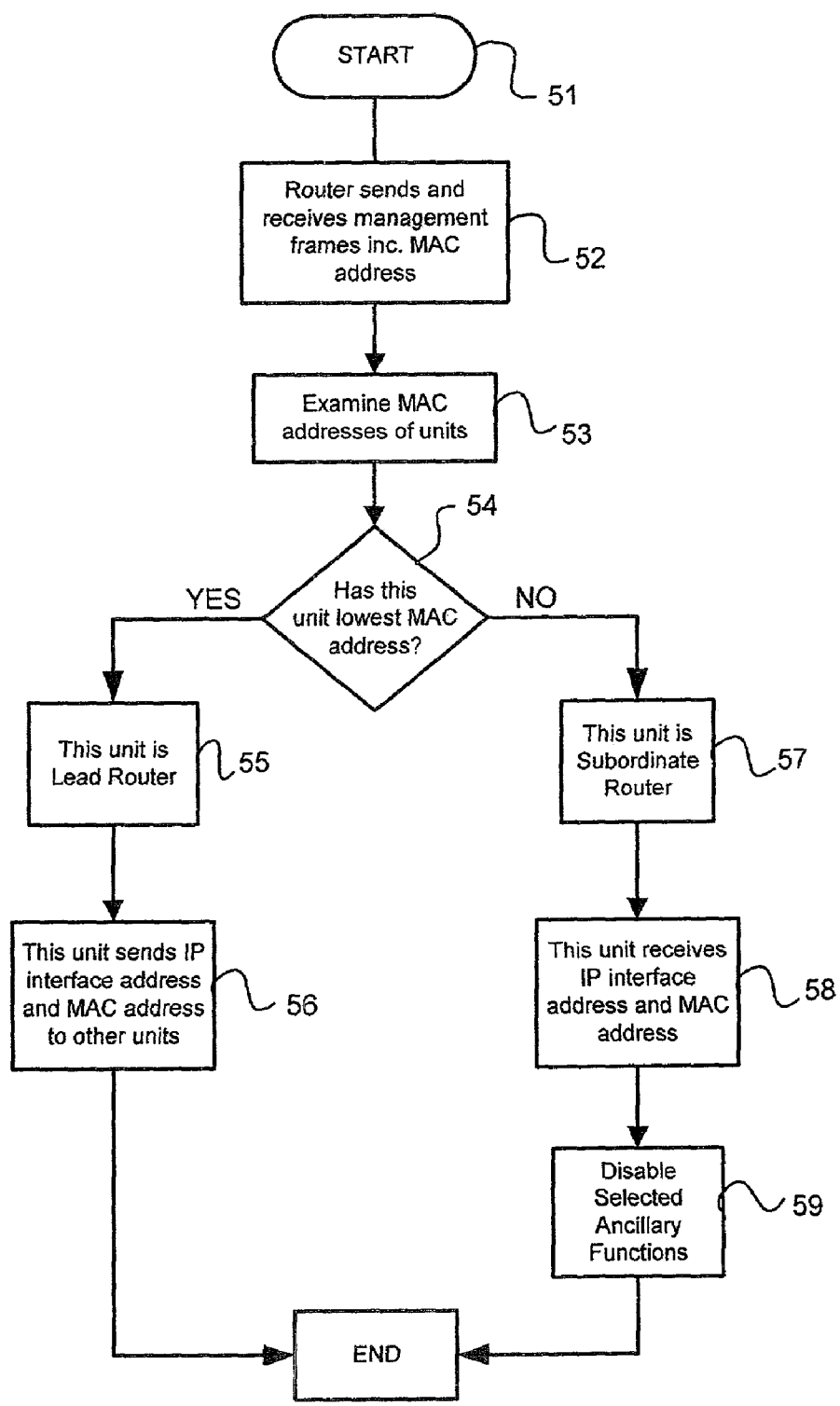
FIG. 4 is a flow diagram illustrating the election of a lead router.

It is necessary when forming the stack or when, for example, a unit containing a 'lead' router is powered-down, or when a new unit is added to the stack to perform an election to determine, in accordance with predetermined criteria, a single lead router for the stack. Methods of conducting an election of a unit in a stack are known per se, as described for example in GB patent No. 2350032. The election and its consequences are shown in FIG. 4.

From a start 51, each router will send and receive (stage 52) by way of the cascade, to the other units management frames including the MAC address of the sender. Each unit will store, in registers provided for the purpose, the MAC addresses of all the units in the stack and on examination of those addresses (stage 53) will determine (stage 54) whether it has the lowest MAC address of the units in the stack.

If the current unit has the lowest MAC address (stage 55) it is 'elected' the lead router. One consequence of this, shown in FIG. 4, is that this unit will send its IP interface address and its MAC address for other units to 'borrow' while this particular configuration of the units in the stack persists. This is readily achieved by means of any suitable known management protocol.

If the current unit does not have the lowest MAC address then it will be designated as a subordinate router (stage 57). It will receive for use at least temporarily a substitute IP interface address and a substitute MAC address from the lead router (stage 58).

Also included in FIG. 4 is a stage 59 denoted 'Disable Selected Ancillary Functions'. The significance is that there are, as indicated specifically later, various ancillary functions such as running a full routing protocol, are unnecessary and may be performed by the current lead router only.

Routing Protocol

Only the 'lead' router need run a full routing protocol, which may be RIP, OSPF or other appropriate routing protocol.

Routing protocols normally comprise (i) an 'advertising' function, by means of which a router informs other routers, by way of routing information packets, of the routers it can reach; and (ii) a 'listening' function, by responding to such packets to build up its routing tables. How the tables are built up depends on the particular protocol. In the present invention the ancillary 'advertising' function need be performed only by the lead router and accordingly that function may be disabled in the subordinate routers by virtue of stage 59 (FIG. 4). In practice there may be automatic discard of the routing information packets that are generated and would otherwise be forwarded by the advertising function.

Address Resolution Protocol

Each unit within the stack generates ARP requests on its own behalf in order to obtain MAC addresses for packets of which the destination MAC address is unknown as required. All units behave identically in this regard.

Figure 5:
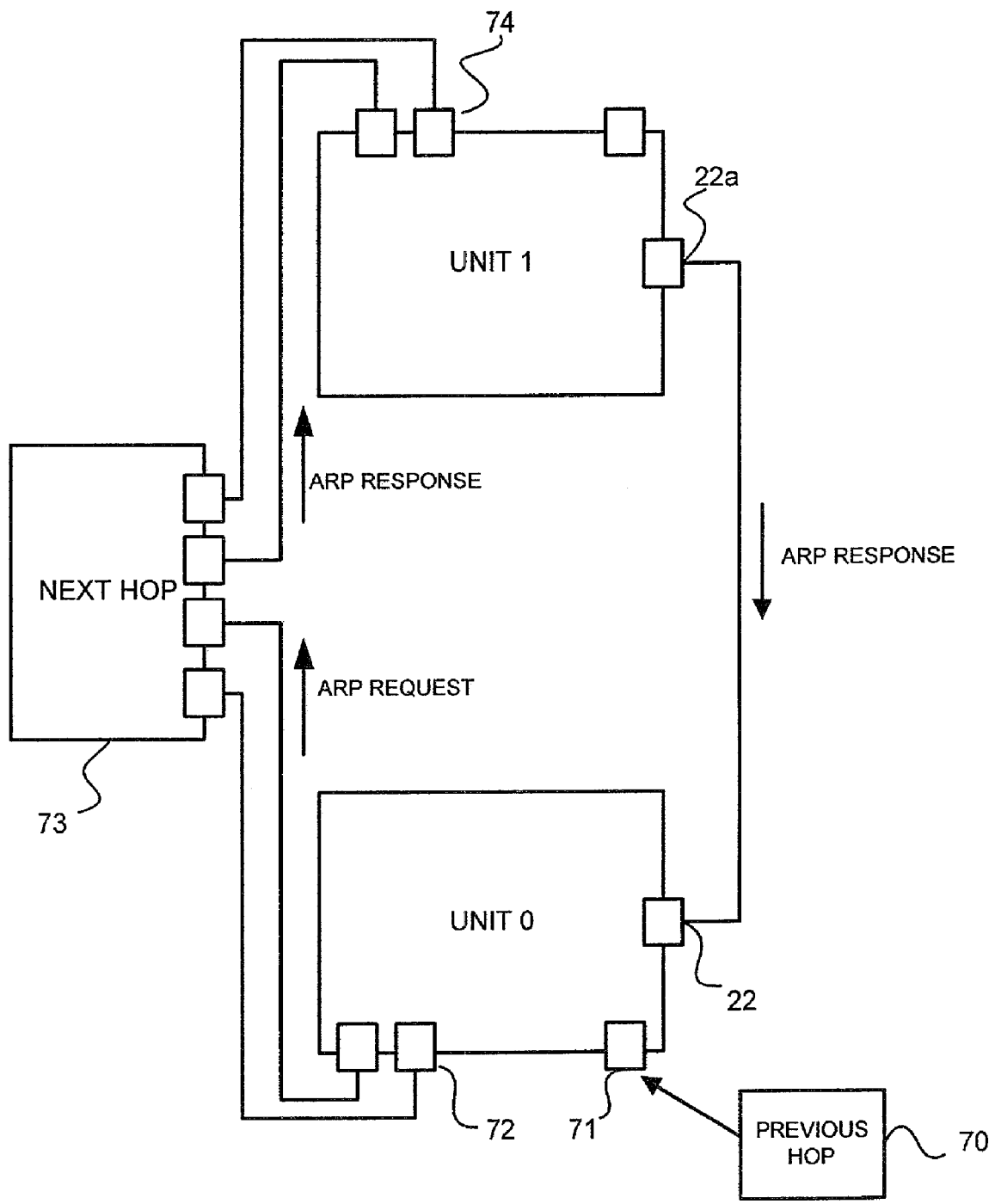
FIG. 5 is a schematic diagram illustrating the invention in relation to a trunked connection.

A complexity arises when an ARP target is connected to the stack by trunked ports, a unit other than the one that requested it might receive an ARP response. This is shown in FIG. 5, wherein a packet from a previous hop 70 is received at a port 71 of Unit 0, which has two ports 72 in a trunk connection to a device 73 (representing the next hop). The trunk connection also includes links to ports 74 on Unit 1. It is presumed that Unit 0 needs to make an ARP request, which will be sent out on all relevant ports.

It is characteristic of trunked connections that any of the links in the trunk can convey a given packet between the entities connected by the trunk. Thus, in this example the ARP request sent to device 73 may generate an ARP response to a port 74 on Unit 1. To allow the requesting unit to see the ARP responses, and also to allow the ARP caches in each unit to synchronise, packets sent to the router interface IP addresses must be sent to the cascade port as well as to the IP stack. This could be done either in software or by hardware configuration.

Normally, since the bridging operation between the units in the stack will ensure that all units see the same ARP packets, the ARP caches on each unit will contain identical entries. If, for some reason, an ARP packet is missed by one of the units and the ARP caches lose their synchronisation, it will not matter because the unit with the missing information would generate an ARP request if it were needed.

ARP requires a small modification for responding to requests to any of the router interface IP addresses. The router interfaces have the same IP addresses and MAC addresses on all units (see below) and so any unit would respond equally to ARP requests to a router interface IP address. Since the ARP packets are broadcast at Layer 2, all units would receive the ARP request and would respond to it. So as to avoid the multiple redundant ARP responses, responses may be suppressed in subordinate units. The relevant functionality may be disabled as described earlier, see stage 59, FIG. 4.

Static Routing Information

The routers may be configured with static routes, static ARP entries, and a static access list. For each unit in the stack to be able to participate in routing so as to appear as if the stack contained a single router, each unit must be configured with the same static information.

In normal stacked operation, the ordinary distributed management protocol will ensure that any static information will be configured on all units at the same time. However, where units with differing history are merged to form a stack, they are likely to have different static information. In this case, the configuration of all units must be made the same using a similar process to that used when bridge configurations are merged.

In the unlikely event of the merged configuration information becoming too large for the configuration tables on each unit, the excess is discarded and some user configuration may be lost. This is considered preferable to trying to retain the information by spreading it across the units in the stack and trying to work out the consequences of having each unit behave differently.

IP Addressing

So that each unit in the stack may participate in the routing, and so that it appears as if the stack contains only one router, the IP addresses of the router interfaces for all units in the stack must have identical IP addresses.

Management

Traffic directed to the router interface IP addresses would normally imply that some entity in the network is attempting to communicate with the routing entity itself or the unit on which the routing entity resides. Typically, this type of communication would be used for the management of the stack itself. Since all the units within the stack share the use of the same IP addresses, this could lead to an ambiguous situation where any of the units within the stack could respond to the same communication. To resolve this ambiguity, the units in the stack other than the 'lead' unit will forward all such communication traffic to the lead unit and only the lead unit will respond. The affect of this is that all the units in the stack must be managed through the lead unit.

MAC Addressing

If stack wide trunks were not supported then if each unit in the stack were to use its own MAC address for the router interfaces, a host would not notice that multiple MAC addresses correspond to each router interface and everything should work fine. However, whenever a host is connected to the stack using trunked ports on different units, it is very likely to notice that more than one MAC address corresponds to the same IP address.

So as to avoid the consequences of this, the MAC addresses of the router interfaces are made the same as previously described. The router unit uses its own MAC addresses and the routing slave units 'borrow' the router unit's MAC address for as long as that router unit remains elected.

Resilience

Resilience requires that any unit in the stack should be able to 'die' (or otherwise leave the stack) and have minimal effect on hosts attached to the remaining units. When a routing slave unit leaves the stack nothing very much changes but, when a router unit leaves, another must be elected.

Since all units in the stack have the same IP addresses for their router interfaces (see above), the new router unit will route from the same addresses as the previous and so the changeover will appear transparent as far as this is concerned.

The MAC address of each router interface will change (for all units) to be one of those owned by the new router unit. The ARP cache ageing in the attached hosts will eventually allow them to send to the new router interface MAC addresses, but, to speed this up, the new unit sends gratuitous ARPs so that attached hosts may learn its MAC addresses as quickly as possible.

The invention claimed is:

1. A stack comprising a plurality of network units and a cascade connection between the network units, each network unit comprising:
    a) a multiplicity of external ports at which addressed packets can be received and from which packets can be forwarded;
    b) at least one cascade port for sending packets to and receiving packets from a cascade connection to other network units;
    c) a router which is responsive to network protocol data in a received packet to determine a subsequent route for said received packet, said router having means defining a network (IP) address for use in routing said packets; and
    d) at least one bridge responsive to media access control addresses in said packets to convey packets between said router and said external ports;
    wherein each of the routers operate to route packets received at any one of the multiplicity of external ports of the respective network unit and such packets are thereafter bridged by at least one of the bridges to at least one external port by which such packets leave the stack;
    wherein the router of one of the said network units operates in a lead mode wherein the lead router sends its network address for use by the routers in each other network unit in the stack;
    wherein the network units are operative to participate in a predetermined process for determining which single one of the network units shall have its router in the lead mode;
    wherein each network unit other than the unit having its router in the lead mode has its router in a subordinate mode wherein selected ancillary functions are suppressed; and
    wherein the suppressed functions include responses to ARP (address resolution protocol) requests to a router interface in the unit.

2. A stack according to claim 1 wherein the routers each have means defining a media access control address for use in routing packets and wherein said lead router sends its media access control address to the router in each other network unit of the stack to provide a substitute media access control address for the router in said each other network unit.

3. A stack according to claim 1 wherein the network units examine media access control addresses of the network units in the stack to determine a result of said predetermined process.

4. A stack according to claim 1 wherein said suppressed selected functions include the provision of routing information packets.

5. A network unit for use in a stack of network units having a cascade connection between the network units, the network unit comprising:
    a) a multiplicity of external ports at which addressed packets can be received and from which packets can be forwarded;
    b) at least one cascade port for sending packets to and receiving packets from the cascade connection to other network units;
    c) a router which is responsive to network protocol data in a received packet to determine a subsequent route for said received packet, said router having means defining a network (IP) address for use in routing said packets; and
    d) at least one bridge responsive to media access control addresses in said packets to convey packets between said router and said external ports and to convey packets received at said cascade port to said external ports;
    wherein said network unit is operative:
    (i) to participate in a predetermined election for determining which single one of the network units shall have its router in a lead mode;
    (ii) to assume said lead mode if the network unit wins said election and to assume a subordinate mode otherwise;
    (iii) when in said lead mode to send a network address for use by the routers in each other network unit in the stack; and
    (iv) when in said subordinate mode to receive a substitute network address from another network unit in the stack and to suppress selected ancillary functions including responses to ARP (address resolution protocol) requests to a router interface in the unit.

6. A network unit according to claim 5 wherein the network unit has means defining a media access control address for use in routing packets and wherein said network unit when in said lead mode sends said media access control address to each other network unit of the stack and when in said subordinate mode receives a substitute media access control address for its router.

7. A network unit according to claim 5 wherein said selected functions include the provision of routing information packets.

8. A network unit for use in a stack of network units having a cascade connection between the network units, the network unit comprising:
    a) a multiplicity of external ports at which addressed packets can be received and from which packets can be forwarded;
    b) at least one cascade port for sending packets to and receiving packets from the cascade connection to other network units;
    c) a router which is responsive to network protocol data in a received packet to determine a subsequent route for said received packet, said router having means defining a network (IP) address for use in routing said packets; and d) at least one bridge responsive to media access control addresses in said packets to convey packets between said router and said external ports and to convey packets received at said cascade port to said external ports;

wherein said network unit is operative:

(i) to participate in a predetermined election for determining which single one of the network units shall have its router in a lead mode;

(ii) to assume said lead mode if the network unit wins said election and to assume a subordinate mode otherwise;

(iii) when in said lead mode to send a network address for use by the routers in each other network unit in the stack; and (iv) when in said subordinate mode to receive a substitute network address from another network unit in the stack; and (v) when in said subordinate mode to suppress selected ancillary functions including the provision of routing information packets and responses to ARP (address resolution protocol) requests.

9. A network unit according to claim 8 wherein the network unit has means defining a media access control address for use in routing packets and wherein said network unit when in said lead mode sends said media access control address to each other network unit of the stack and when in said subordinate mode receives a substitute media access control address for its router.

* * * * *